May 10, 1932. T. W. KINGS Re. 18,456
CARBURETOR
Original Filed May 17, 1923
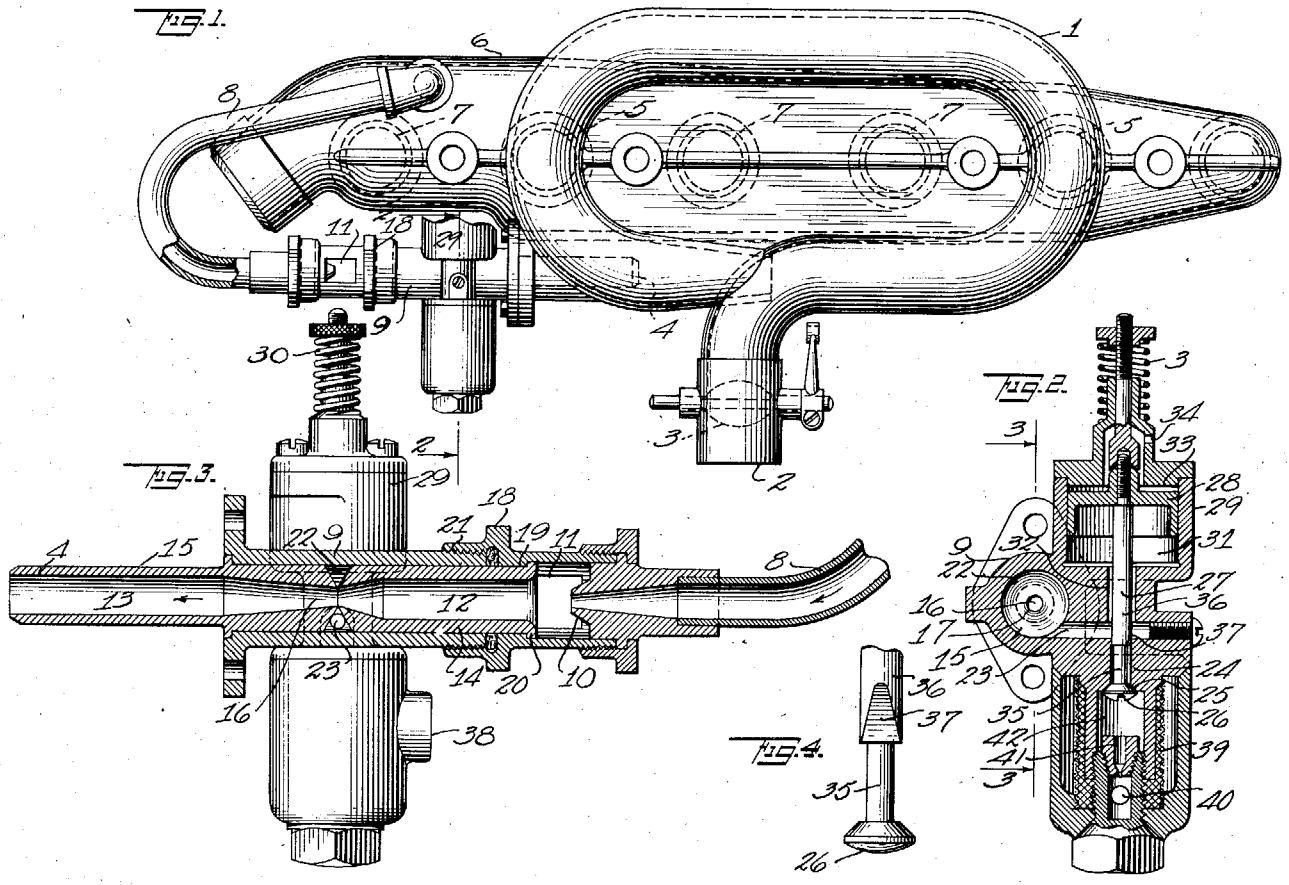
INVENTOR.
Thomas W. Kings
BY Dyke, Holden & Schaimer
ATTORNEYS.

Reissued May 10, 1932

Re. 18,456

UNITED STATES PATENT OFFICE

THOMAS W. KINGS, OF HARVEY, ILLINOIS, ASSIGNOR, BY MESNE ASSIGNMENTS, TO MAXMOOR CORPORATION, OF NEW YORK, N. Y., A CORPORATION OF DELAWARE

CARBURETOR

Original No. 1,624,604, dated April 12, 1927, Serial No. 639,521, filed May 17, 1923. Application for reissue filed February 6, 1929. Serial No. 338,001.

The purpose of this invention is to provide a carburetor for governing, and automatically regulating the supply of fuel to, internal combustion engines, as required under different conditions of operation. Thus, when an engine, equipped with this carburetor, is started the carburetor will first operate to admit a maximum quantity of fuel in proportion to the air taken by the engine. As the latter warms up and is operating more effectively and at a speed producing greater suction, the fuel orifice of the carburetor automatically decreases in area and thus reduces the supply of fuel to what is required for idling speeds; or, if the engine is under load, the carburetor will function to supply the proper mixture which is normally required for the most efficient operation of the engine according to the load carried.

The present invention is further distinguishable from prior art carburetors in that when the engine is subjected to an abnormal load and is consequently slowed down to near the starting speed, the fuel supply orifice will again automatically increase in size to compensate for the loss of suction.

It is also the object of the invention to effect a more thorough disintegration of the fuel than is possible with carburetors heretofore in use, particularly when the speed of the engine is decreased due to heavy load.

It is also among the purposes of the invention to provide a charge-forming device of simplified construction not requiring the use of a float, but which, nevertheless, operates automatically to maintain a fuel level in the carburetor, and to provide a carburetor which insures the required feed of the fuel from a supply tank at lower level, without the use of pressure pumps or the well-known vacuum tanks.

The objects of the invention are accomplished by the device shown in the accompanying drawings, in which:—

Figure 1 is a face view of the engine intake and exhaust manifolds showing partly broken away, the carburetor and its connections to these manifolds.

Figure 2 is a sectional view of the carburetor on the line 2—2 of Figure 1.

Figure 3 is a sectional view taken on the line 3—3 of Figure 2.

Figure 4 is a detail view of the fuel valve in the carburetor.

In fuel feeding and disintegrating devices the disintegration of the fuel is usually proportional to the speed of the air passing the fuel orifice of the disintegrating device. Also, when a thorough mechanical disintegration of the fuel is effected, there is less need for the use of heat in preparing the charge of fuel and air for use in the engine cylinders, and consequently a higher volumetric efficiency of the engine is assured. In carburetors now generally in use, the speed of the air past the fuel orifice does not increase in proportion to the opening of the throttle. With the engine idling, and the throttle nearly closed, there is, of course, a very considerable vacuum in the intake manifold, but it is not available for atomizing the fuel because of being cut off from the fuel by the throttle valve. When the throttle is opened to compensate for increased load or to speed up the engine, although the vacuum in the manifold decreases, the speed through the carburetor will increase because what vacuum there is is available for action in the carburetor, but after the throttle is further opened, the vacuum in the manifold will continue to decrease but the speed through the carburetor will not increase in proportion to the throttle opening, although at this time it is needed most to atomize the greater quantity of fuel which is necessary to pull the increased load. There is also a reduction in the pumping action of the engine because of its lower speed when under load. The degree of vacuum in the intake manifold is proportional to the speed of the engine at any given position of the throttle, but the vacuum is least when the throttle is wide open because of the free inrush of air.

In the present construction, compensation is made for a reduction in vacuum in the intake manifold by the use of a fuel injector, preferably operated by the pressure in the exhaust manifold. The carburetor utilizes a piston under the influence of the partial vacuum in the intake manifold, to regulate the size of the fuel orifice in the carburetor, and to maintain a fuel level in the carburetor. The fuel is, therefore, drawn from the supply tank directly through the carburetor by the depression in the intake manifold, and the quantity of the fuel delivered to the engine is, therefore, in a measure dependent upon the vacuum in the intake manifold, except as modified by the exhaust operated injector and the position of the throttle, which in this case may merely control the main air supply to the intake manifold. When the loads are light or the engine is idly running, the fuel venturi functions mostly by the partial vacuum in the intake manifold, while with heavier loads and wide open throttles, it functions mostly by the pressure in the exhaust manifold, through the influence of the jet operated by the exhaust gas. The pressure of the exhaust gases increases with the opening of the throttle when the loads are heavy.

The construction as illustrated in the drawings, includes an intake manifold 1 around which the charge may circulate and recirculate, having a main air inlet 2 controlled by a throttle 3, and a fuel and air inlet 4. The outlets 5 of the intake manifold each lead to the intake ports of a pair of cylinders. The exhaust gases from the cylinders are delivered to the exhaust manifold 6 through the openings 7 therein. A conduit 8 leads from the exhaust manifold to the carburetor 9. Conduit 8 terminates at the carburetor in a nozzle 10, at the sides of which are air inlets 11.

With this arrangement, the pressure in the exhaust manifold is utilized to cause a small stream of the exhaust gases at high velocity to be delivered by the nozzle 10 into the passageway 12 in the carburetor, which passageway is in alinement with a passageway 13, terminating in the opening 4 to the intake manifold. The jet of the exhaust gas delivered by nozzle 10 serves to draw air into the carburetor through the openings 11. Air is also urged to flow through these openings due to the reduction in pressure of the intake manifold 1. The passages 12 and 13 are formed in tubular members 14 and 15 with their inner ends tapered to form a Venturi passageway 16.

Fuel enters the Venturi passageway through a small gap 17, at the point of least diameter of the venturi. This gap is regulated as to size by a permanent setting of the tubes 12 and 13, tube 12 being adjustable with respect to tube 13 by means of a nut 18, having a shoulder 20 on tube 12 and having threaded engagement at 21 with the carburetor 9. The space 22 surrounding the adjacent ends of tubes 12 and 13 forming the venturi, communicates through a transverse passageway 23 and a vertical passageway 24 with a fuel port 25 controlled by valve 26. The stem 27 of this valve at its upper end carries a piston 28 which is slidable in a cylindrical part 29 of the carburetor body. A spring 30 normally urges the piston to the upper position where it holds valve 26 closed. The chamber 31 below the piston is subject to the reduced pressure in the intake manifold and the aspiratory action of venturi 16, since this space is in communication with passageway 23 through the vertical passageway 32 surrounding the stem of valve 27. The space 33 above the piston 28 is in communication with the outer atmosphere through the port 34. The position of the piston is, therefore, dependent upon the difference in pressure between the atmosphere pressure above the piston and the partial vacuum below it. Therefore, when the engine is in operation, valve 26 is lowered, thus permitting fuel to rise in the passageway 24 past the reduced part 35 of the valve stem and into the passageway 23. The upper enlarged part 36 of the valve stem 27 is of the same diameter as the vertical passageway 24, but is tapered at 37 near the upper end of the passageway 24. This tapered part of the valve stem forms a second valve, which, when valve 26 is moved from its seat, operates as a regulating means for automatically controlling the flow of fuel and maintaining the desired fuel level in passageway 23. The fuel supply pipe is connected to the carburetor at the boss 38, Figure 3. The fuel passes through the screen 39, ports 40 and 41 before entering the space 42 below valve 26.

In the operation of the device, a fuel level is maintained in the transverse passageway 23 of the carburetor, or its rate of delivery to this passageway is controlled by means of a partial vacuum in the space 22 surrounding the fuel orifice 17 of venturi 16. When there is a reduced pressure in this space, there is a difference in pressure between the upper and lower sides of piston 28, and the piston is thereby lowered from its normal position against the action of spring 38. The valve 26 is thereby moved from its seat allowing the fuel to be drawn into the passageway 23 and from there through the space 22 surrounding the orifice 17 of the venturi and into the venturi where it becomes disintegrated and mixed with the air entering the carburetor through the opening 11. The rate of flow of the fuel and air is dependent upon this difference in pressure, which in turn depends upon the reduced pressure in manifold 1, according to the speed and pumping action of the engine pistons. However, the reduced pressure in the space 22 surrounding the fuel venturi is also dependent upon the injector action of the exhaust gases passing through the venturi from nozzle 10. The pressure of the exhaust gas is also dependent upon the work performed or load on the engine. Therefore, when there is a decrease in the vacuum in manifold 1 due to a slowing up of the engine when under load, this is compensated for by the increased injector action due to the increase in pressure in the exhaust manifold. The tapered part 37 of valve stem 28 insures a maximum supply of fuel when valve 26 is first moved from its seat and gradually restricts the flow by more or less closing the upper end of passageway 24 as the piston 28 moves downwardly upon an increase in suction due to speeding up of the engine. Likewise, in the reverse motion of piston 28 when there is a falling off in difference in pressure below and above the piston the flat tapered part 37 of the valve stem 27 serves to permit a slight increase in free flow of the fuel as valve 26 approaches its seat. An excessive flow of fuel through the carburetor is prevented by valve 26 moving toward its seat whenever passageway 23 becomes chocked, since closing or partly closing passageway 23 cuts off communication between the partial vacuum in chamber 22 and chamber 31 under the piston 28. The piston then rises under the action of spring 30, closing or partly closing valve 26. When the fuel level is again lowered, communication is restored between chamber 31 and the intake manifold, causing the piston 28 to again move downwardly and open the valve.

Although but one specific embodiment of this invention has been therein shown and described, it will be understood that numerous details of the construction shown may be altered or omitted without departing from the spirit of this invention as defined by the following claims.

I claim:

1. A charge-forming device of the class described comprising a Venturi tube, an intake manifold with which said Venturi tube is in communication at one of its ends, a fuel passageway in communication with said Venturi tube near its point of smallest diameter, a valve for controlling the level of fuel in said passageway, and means for operating said valve, said means being subject for operation, to the aspiratory action of said Venturi tube and the level of the liquid in said passageway.

2. A charge-forming device of the class described comprising a Venturi tube, an exhaust manifold with which said Venturi tube is in communication at one of its ends, a fuel passageway in communication with said Venturi tube near its point of smallest diameter, a valve for controlling the level of fuel in said passageway, and means for operating said valve, said means being subject for operation, to the aspiratory action of said Venturi tube and the level of the liquid in said passageway.

3. In combination, an intake manifold, a fuel reservoir, a conduit connecting said fuel reservoir with said intake manifold, and suction responsive means for increasing the effectiveness of the manifold suction for drawing fuel through said conduit when said manifold suction is low, and for decreasing the effectiveness of the manifold suction for drawing fuel through said conduit when said manifold suction is high.

4. In an internal combustion engine, an intake conduit, a throttle therein, means for supplying fuel to the intake conduit, means for creating a pressure reduction varying with the engine load and supplementing the intake pressure reduction principally at the wider open throttle positions, a device in communication with the intake above the throttle and with said last named means and responsive to the pressure variations therein, and means actuated by said pressure responsive device for controlling the fuel supplying means.

5. In an internal combustion engine, an intake conduit, fuel supplying means communicating therewith, means for subjecting the fuel supply means continuously throughout the range of operation of the engine to the action of a stream of gases from the engine for disintegrating the fuel, and means for controlling the extent of opening of the fuel supplying means to vary the fuel supply automatically substantially in inverse relation to variations in suction.

6. In an internal combustion engine, an intake manifold having a mixing chamber, a throttle valved air inlet, a conduit for fuel, and a conduit for gaseous fluid under superatmosphere pressure varying with the control of the air, all three leading to the mixing chamber, the last in inductive relation to the next last, a metering valve in the fuel conduit, and means subject to the pressure variation in the mixing chamber for actuating said metering valve to control the fuel passage in inverse relation to the intake pressure reduction variation at the discharge end of the fuel conduit.

7. In an internal combustion engine, an intake conduit, means for controlling the passage of air through said conduit, fuel supplying means communicating with said conduit intermediate said air controlling means and the engine cylinders and subject to the variations in pressure reduction therein, means for passing a gaseous stream varying in kinetic energy in inverse relation to the variations in intake pressure reduction acting on the fuel in inductive relation to said fuel supplying means and pressure responsive means for controlling the extent of opening of said fuel supplying means substantially in inverse relation to the pressure reduction acting on the fuel.

8. In an internal combustion engine, an intake conduit, means for controlling the passage of air through said conduit, fuel supplying means communicating with said conduit intermediate said air controlling means and the engine cylinders and subject to the variations in pressure reduction therein, means for subjecting said fuel supplying means to the inductive effects of a stream of gases from the engine; the intake pressure reduction and the inductive effects of said gases varying substantially in inverse relation to each other and complementing each other in causing fuel flow directly from the fuel supply tank at a lower level, and means responsive to suction variations for controlling the extent of opening of the fuel supplying means substantially in inverse relation to the suction variations acting on the fuel.

9. In an internal combustion engine, an intake conduit, a throttle therein, fuel supplying means having a discharge orifice communicating with the intake above the throttle, means for creating a pressure reduction at said orifice varying with the engine load and supplementing the intake pressure reduction principally at the wider open positions of the throttle, a device in communication with the intake above the throttle and with said last named means and responsive to the pressure variations therein and means actuated by said pressure responsive device for controlling the fuel supplying means in inverse relation to the pressure reduction acting on the fuel.

10. In an internal combustion engine, an intake manifold, a venturi tube communicating with said manifold, a fuel passageway in communication with said Venturi tube adjacent to the constriction thereof, a valve for controlling said passageway, and a pressure responsive valve actuating device communicating with said venturi tube through said passageway.

11. In an internal combustion engine, an exhaust conduit, an intake conduit, a throttle therein, a bypass from said exhaust conduit to said intake conduit above the throttle, means for supplying air to said bypass, and means for supplying fuel through said bypass to said intake above the throttle; said exhaust gas, air and fuel supplying means being subject to the intake pressure reduction in the intake above the throttle at closed or partially closed positions of the throttle.

12. In an internal combustion engine, air supplying means, means for controlling said air supply means, fuel supplying means subject to the reduction in intake pressure in said air supplying means intermediate said air controlling means and the engine cylinders, and gas operated aspirating means associated with said air and fuel supplying means for augmenting the effect of piston movement in causing flow of air to the engine cylinders and for creating a reduction in pressure complementing intake depression in causing fuel to be elevated through said fuel supplying means, and means for varying the fuel passage area in inverse relation to the variations in pressure reduction or the fuel resulting from movement of the air controlling means.

13. In an internal combustion engine, air supplying means, means for controlling said air supplying means, fuel supplying means having a discharge orifice subject to the reduction in intake pressure in said air supplying means intermediate said air controlling means and the engine cylinders, gas operated aspirating means associated with said air and fuel supplying means for augmenting the effect of piston movement in causing flow of air to the engine cylinders and for creating a reduction in pressure at said orifice varying inversely with and complementing intake depression in causing a discharge of fuel through said orifice, and means responsive to the variations in pressure reduction on the fuel for inversely varying the opening of said orifice.

14. In an internal combustion engine, air supplying means, means for controlling said air supplying means, a fuel supply tank having a fuel line terminating in a discharge orifice subject to the intake depression in said air supplying means intermediate said air controlling means and the engine cylinders, aspirating means associated with said air supplying means and said discharge orifice and traversed by a gaseous stream from the engine varying in kinetic energy substantially in inverse relation to the variations in intake depression for augmenting the effect of piston movement in causing flow of air to the engine cylinders and for creating a reduction in pressure at said discharge orifice for complementing intake depression in causing the fuel to be elevated by atmospheric pressure from said tank and discharged through said orifice, and means responsive to variations in pressure reduction for inversely varying the opening of the fuel line.

15. In an internal combustion engine, an exhaust conduit, an intake conduit, a throttle therein, exhaust gas air aspirating means interposed between said exhaust conduit and said intake conduit above the throttle, and fuel supplying means communicating with said air aspirating means and subject to the intake pressure reduction and the reduction in pressure resulting from the flow of gaseous stream through said aspirating means for causing the elevation of fuel.

16. In an internal combustion engine, an exhaust conduit, an intake conduit, a throttle therein, a bypass from said exhaust conduit to said intake conduit above the throttle, air admitting means to said bypass, a venturi in said bypass, fuel supplying means having a discharge orifice communicating with said venturi adjacent to the constriction thereof and subject to the intake pressure reduction and the reduction in pressure resulting from the passage of gases through said venturi for causing elevation of fuel directly from the fuel supply tank under atmospheric pressure, and means responsive to variations in suction for controlling the extent of opening of the fuel passage.

17. In an internal combustion engine, exhaust and intake conduits, a throttle in said intake conduit, means for utilizing exhaust gas from the conduit thereof for creating a reduction in pressure, fuel supplying means to said intake conduit, a valve for controlling the flow of fuel therethrough, and means communicating with said intake conduit above the throttle and with said exhaust gas utilizing means and responsive to the pressure variations therein for actuating said valve.

18. In an internal combustion engine, an intake, a throttle therein, fuel supplying means to said intake, means for controlling said fuel supplying means having a valve adapted to seat to close the fuel supplying passage, said valve having a portion for controlling the extent of opening of said passage as said valve moves relative to the seat thereof, means for creating a reduction in pressure varying with the engine load and supplementing the intake pressure reduction principally at the wider open throttle positions, and a device in communication with the intake above the throttle and with said last named means and responsive to the pressure variations therein for actuating said fuel supply controlling means.

19. In an internal combustion engine, an exhaust, an intake, a throttle therein, a bypass from exhaust to intake above the throttle, a venturi in said bypass, a fuel supplying conduit communicating with said venturi adjacent to the constriction thereof, and valvular means communicating through said conduit with said venturi and responsive to the pressure variations therein and to the variations in fuel level in said conduit for controlling said conduit.

20. In an internal combustion engine, an intake, a throttle therein, a fuel supplying conduit having a discharge orifice in communication with the intake above said throttle, means for creating a reduction in pressure at said orifice varying with the load and supplementing the intake pressure reduction principally at the wider open throttle positions, fuel supplying conduit controlling means having a valve adapted to seat to close the fuel supplying conduit and a portion for controlling the extent of opening thereof as said valve moves relative to the seat thereof, and means communicating through said conduit with said pressure reduction creating means and subject to the pressure variations at said fuel orifice for actuating the fuel supply controlling means in response to variations in pressure and in the level of fuel in said conduit.

21. In combination, an intake manifold, a throttle therein, a fuel conduit communicating with the manifold at the engine side of the throttle, and subject to the pressure reduction therein for causing fuel flow, means for creating a pressure reduction for causing fuel flow varying in inverse relation to the fuel flow inducing effects of the variations in pressure reduction in the manifold resulting from throttle movement, and suction responsive means for increasing the effectiveness of the manifold suction for drawing fuel through said conduit when the said manifold suction is low, and for decreasing the effectiveness of the manifold suction for drawing fuel through said conduit when said manifold suction is high.

22. In an internal combustion engine, an intake, a throttle therein, means for supplying fuel to the intake, means at the engine side of the throttle for creating a pressure reduction by gas flow, and means responsive to both the kinetic and static pressure reductions for varying the fuel flow.

23. In an internal combustion engine, an intake, a throttle therein, means for conducting fuel into the intake at the engine side of the throttle subject to the static pressure reduction therein, and to pressure reduction due to gas flow, and means responsive to the combined pressure reductions for varying the fuel flow in inverse relation thereto.

24. In an internal combustion engine, an intake, a throttle therein, a venturi at the engine side of the throttle traversed by air induced into the intake by engine suction, fuel supplying means communicating with said venturi, and subject to the fuel flow inducing effects of intake depression and gas flow through the venturi, means for injecting gases varying in pressure directly with the intake pressure through the venturi to augment the fuel inducing effect of gas flow on fuel induction as the intake depression decreases, and means for controlling the fuel passage area substantially in inverse relation to the intake depression.

25. In an internal combustion engine, an intake, a throttle, means for conducting fuel into the intake at the engine side of the throttle, means for discharging gases from the engine varying in pressure with the conditions of engine operation into inductive relation to the discharge end of the fuel line, the pressure reduction caused thereby varying in inverse relation to the intake depression variations resulting from throttle movement, and means for varying the fuel passage area by and in inverse relation to variations in pressure reduction on the fuel.

26. In an internal combustion engine, an intake, a throttle therein, means for conducting fuel into the intake at the engine side of the throttle under the action of intake depression, means for discharging a gas varying in pressure substantially directly with the air supply in inductive relation to the discharge end of the fuel line for supplementing intake depression in causing fuel flow, and means for modulating the fuel flow by and in inverse relation to the variations in pressure reduction on the fuel.

27. In an internal combustion engine, an intake, a venturi for the passage of air into the intake, means for introducing fuel into the venturi subject to air flow therein, means for discharging gases into said venturi to augment air and fuel flow, and means for varying the fuel passage area in response to variations in pressure reduction on the fuel.

28. In an internal combustion engine, an intake, a throttle therein, means for supplying fuel to the intake at the engine side of the throttle subject to intake depression, means for subjecting the discharge end of the fuel line to the inductive action of gases for supplementing the action of intake depression on fuel flow, and means responsive to the variations in pressure reduction for varying the fuel passage area in inverse relation to the pressure reduction.

29. In an internal combustion engine, an intake, a throttle therein, means for injecting gases under superatmospheric pressure into the intake at the engine side of the throttle, means for causing fuel flow into the intake by the action of the intake depression and of said gases, and means for varying the fuel passage area in inverse relation to the intake depression variations resulting from throttle movement.

30. In an internal combustion engine, an air inlet passage, means for controlling the extent of opening of said air inlet passage, fuel supply means for delivering fuel into the region of reduced pressure between the air controlling means and the engine cylinders, gaseous blast means under superatmospheric pressure serving to comminute the fuel, valve means for regulating the extent of opening of the fuel passage, spring means tending to open the valve means, and means responsive to the reduced pressure in the aforesaid region and tending to reduce the extent of fuel valve opening, whereby the fuel supply is regulated as a direct function of the spring action and an inverse function of the pressure reduction.

31. In an internal combustion engine, an intake, a throttle therein, means for inducing fuel flow into the intake at the engine side of the throttle by the combined effects of intake depression and a discharge of a gas under superatmospheric pressure, varying in fuel inducing effect in inverse relation to the variations in intake depression resulting from throttle movement, and means for restricting the fuel passage area as the intake depression becomes high.

32. In an internal combustion engine, an intake, a throttle therein, means for causing fuel flow into the intake at the engine side of the throttle by the combined effects of air flow pressure reduction and intake depression, means for discharging a gas in inductive relation to said fuel flow inducing means for augmenting the pressure reduction due to gas flow, the effect of the latter varying in inverse relation to the variations in intake depression resulting from throttle movement, and means responsive to the pressure reduction for varying the fuel passage area inversely to the intake depression.

THOMAS W. KINGS.